US006849842B2

(12) United States Patent
Little

(10) Patent No.: US 6,849,842 B2
(45) Date of Patent: Feb. 1, 2005

(54) ROTATING SHADOWBAND PYRANOMETER

(75) Inventor: Ruel D. Little, Concord, MA (US)

(73) Assignee: RWE Schott Solar, Inc., Billerica, MA (US)

( * ) Notice: Subject to any disclaimer, the term of this patent is extended or adjusted under 35 U.S.C. 154(b) by 23 days.

(21) Appl. No.: 10/459,335

(22) Filed: Jun. 11, 2003

(65) Prior Publication Data

US 2004/0016865 A1 Jan. 29, 2004

Related U.S. Application Data

(60) Provisional application No. 60/392,389, filed on Jun. 29, 2002.

(51) Int. Cl.[7] ............................................... G01C 21/02
(52) U.S. Cl. ..................... 250/203.4; 356/218; 126/573
(58) Field of Search ........................... 250/203.1, 203.2, 250/203.3, 203.4, 233; 356/215, 216, 218, 220, 225; 126/573–578

(56) References Cited

U.S. PATENT DOCUMENTS

| 4,168,124 A | | 9/1979 | Pizzi |
| 4,218,139 A | | 8/1980 | Sheffield |
| 4,253,764 A | | 3/1981 | Morrill |
| 4,320,288 A | * | 3/1982 | Schlarlack ............... 250/203.4 |
| 4,430,000 A | | 2/1984 | Eldering et al. |
| 4,491,727 A | * | 1/1985 | Appelbaum et al. ........ 356/222 |
| 4,588,295 A | * | 5/1986 | Eldering et al. ............ 356/300 |

* cited by examiner

*Primary Examiner*—Kevin Pyo
(74) *Attorney, Agent, or Firm*—Pandiscio & Pandiscio

(57) ABSTRACT

A pyranometer for measuring solar irradiance at a selected site comprises a light detector adapted to produce an output signal in response to incident solar radiation, a reversible motor having a curved shadowband attached to its output shaft, means for mounting the light detector and motor so that the shadowband is at a fixed distance from the light detector; and a motor controller that is adapted to periodically cause the motor to rotate the shadowband from one to the other of two limit positions, with the shadowband acting to momentarily shadow the light detector during its movement between its two limit positions. A datalogger stores and processes the light detector's signal output to provide a measure of total horizontal, direct normal and horizontal diffuse solar irradiance.

18 Claims, 13 Drawing Sheets

S1 HALL EFFECT SENSOR IN HEAD UNIT
S2 HALL EFFECT SENSOR IN HEAD UNIT
MAGNET ON SENSOR = 0V
MAGNET OFF SENSOR = 5V

ROTATING SHADOWBAND PYRANOMETER

This application claims the benefit of the filing date of U.S. Provisional Patent Application No. 60/392,389, filed Jun. 29, 2002 for "Rotating Shadowband Pyranometer".

FIELD OF THE INVENTION

This invention relates to apparatus for measuring solar radiation and more particularly to a pyranometer adapted to measure direct normal and horizontal diffuse solar irradiance.

BACKGROUND OF THE INVENTION

Photovoltaic (PV) power is a desirable complement to conventional electric power generation delivery systems. In assessing the value of photovoltaic power generation, electric power planners require solar energy resource data for specific areas where photovoltaic modules are to be installed. Solar energy reaches the earth surface along two paths-irradiance directly from the sun and diffuse irradiance from the sky. Both of those components are required in order to estimate the energy produced by PV systems in a given location. Direct normal and horizontal diffuse solar irradiance data and temperature data are used to estimate the energy produced by fixed and tracking PV systems. Those estimates support utility planning and PV system design studies by comparing the performances of various fixed and tracking array concepts. The data acquired can be used to compute the DC and AC power output for any fixed or tracking PV system at a given location.

Various forms of apparatus have been conceived for measuring solar radiation. Circa the year 1995 Ascension Technology Inc. (ATI), located in Waltham, Mass., introduced to the market a rotating shadowband pyranometer that was adapted to measure direct normal and horizontal diffuse irradiance. The ATI pyranometer is illustrated in FIGS. 1 and 2. It utilized a single light sensor 2 to determine total horizontal, direct normal and horizontal diffuse irradiance. The light sensor 2 was mounted on a bracket 4 attached to the end of a stationary tube 6 that was secured to a hollow stationary shaft 8 that in turn was affixed to one wall of a housing 10. The signal output of the light sensor was coupled to an electronic data logging system (not shown) by a cable (also not shown) that passed through tube 6 and shaft 8.

A shadowband in the form of a curved opaque strip 12 had one end attached to a member 14 that was secured to one face of a gear 16 that was mounted for rotation on shaft 8. Gear 16 meshed with a second gear 20 affixed to the output shaft 22 of an electric motor 24. The latter was mounted to a bracket 26 that had a pair of perforated ears 28 (only one of which is visible in FIG. 1) located along its opposite sides. Ears 28 that were used to pivotally mount the bracket to a yoke 30 mounted on a vertical post 32 that was fixed to the ground or to a building. Yoke 30 was rotatable on post 32 to permit it to be positioned to a selected azimuth position for optimum monitoring of sunlight.

Rotation of the shadowband was achieved by energizing motor 24, with operation of the motor being initiated and stopped by an electronic controller (not shown). The controller periodically caused the motor to rotate the shadowband unidirectionally through 360°, with rotation of the shadowband taking approximately one second. During that one-second interval the data logger sampled the pyranometer signal approximately 700 times. The sampling irradiance data was then analyzed to provide an estimate of the electrical power that could or should be produced by an existing or planned PV system. Typically the data logger and controller were mounted in a common box-like enclosure 36 that also contained a battery power supply (not shown) for the pyranometer, and a PV module 38 was attached to yoke 30 and connected to the battery so as to keep the latter charged by sunlight-derived electric power.

The ATI rotating shadow band pyranometer functioned well but suffered from the limitation that the mechanical structure for supporting and driving the shadow band was complicated and hence expensive. Friction in the gear system would cause it to wear out and bind over time. Also water penetration from rain affected the reliability and life of the drive system for the shadow band and/or associated electrical and electronic components, and repair or replacement of one or more components typically involved removal of substantially the entire drive system. Removal of the drive system included removal of the irradiance sensor which was assigned a unique calibration number. As a consequence of removing the drive system, the calibration number factor in the datalogger calculations needed to be adjusted.

OBJECTS AND SUMMARY OF THE INVENTION

The object of the invention is to provide a rotating shadow band pyranometer that overcomes the limitations of the ATI device. A more specific object is to provide a rotating shadow band pyranometer that employs a direct drive relationship of the electric motor and the shadow band with the shadow band and the light sensor being separable from the electric motor, thereby facilitating replacement of a disabled motor at lesser cost than previously.

Another object of the invention is to provide a rotating shadow band pyranometer wherein the shadow band rotates periodically from one stowed position to another stowed position, with the angle of rotation measured from one stowed position to the other being approximately 300°.

Another object of the invention is to provide a rotating shadow band pyranometer that permits three degrees of adjustment, i.e., adjustment on three axes, of the position of the light sensor.

A more specific object is to provide a rotating band pyranometer that is simpler, less expensive and more reliable than the Ascension Technologies pyranometer.

A further specific object is to provide a pyranometer for the purpose described that comprises a motor housing that permits ready access to the motor that rotates the shadow band and is characterized by weep holes for draining any moisture that may tend to accumulate in the motor housing.

The foregoing objects are achieved by providing a rotating shadow band pyranometer that comprises a motor enclosure containing a motor, a disk with a magnet mounted for rotation with the output shaft of the motor, a curved shadow band, means connecting one end of that band to the motor's output shaft so that the band will rotate with the output shaft, and two Hall-effect sensors that interact with the magnet to sense the rotational location of the band and determine first and second limit positions for the band that are spaced apart by an angle of approximately 300 degrees. The motor enclosure is affixed to a bracket that is pivotally attached to a yoke that is pivotally mounted to a support structure to permit angular orientation about a first axis, with the pivot connection between the bracket and the yoke providing a second pivot axis. The bracket includes an extended portion to which is attached a tongue that carries a light sensor. The end of the tongue is pivotally mounted to the bracket so as to permit the light sensor to undergo pivotal adjustment on a third axis that extends at an angle to the other two axes.

The motor and the light sensor are connected to a controller that periodically causes the motor to rotate the band in a first or second direction between the first and second limit positions. The controller causes the motor to rotate the shadow band until one of the Hall-effect sensors detects the near presence of the magnet embedded in the disk, whereupon the controller halts the rotation with the shadow band stowed in one of the two limit positions. The shadow band then remains stationary until the controller causes the motor to rotate in the opposite direction to where the magnet is sensed by the other Hall-effect sensor, whereupon the controller halts rotation of the shadow band in the other limit position. The band remains stowed in the second limit position until the controller again initiates operation of the motor in a direction opposite to its previous operation. The controller is preferably situated in a separate enclosure with a data logger that stores and processes the signal output of the light sensor. Preferably the data logger controls operation of the motor controller, periodically initiating a start up signal to the motor.

Other features and advantages of the invention are described or rendered obvious by the following specific description that is to be considered together with the accompanying drawings.

THE DRAWINGS

DETAILED DESCRIPTION OF THE INVENTION

Figure 1:
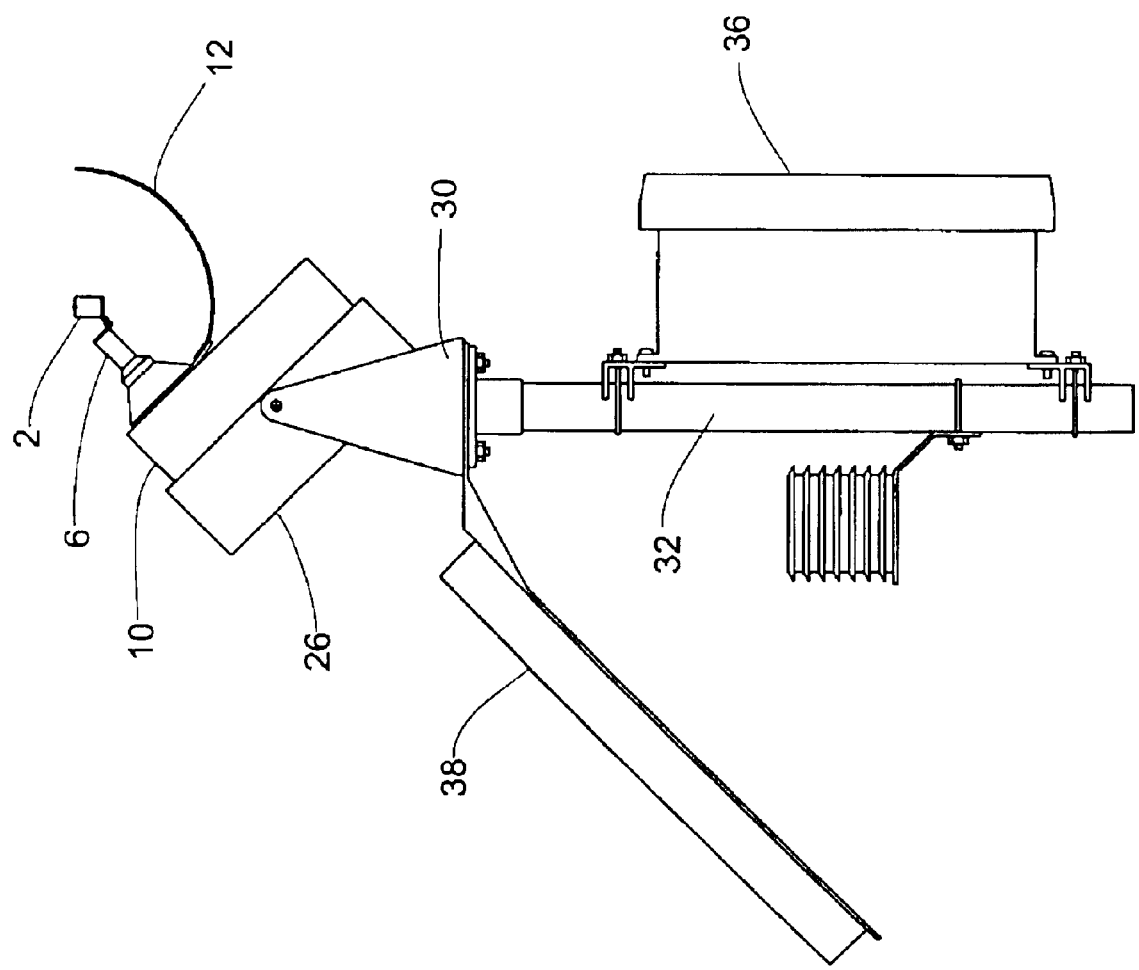
FIG. 1 is a side view in elevation of the Ascension Technology Inc. pyranometer discussed above.
Figure 2:
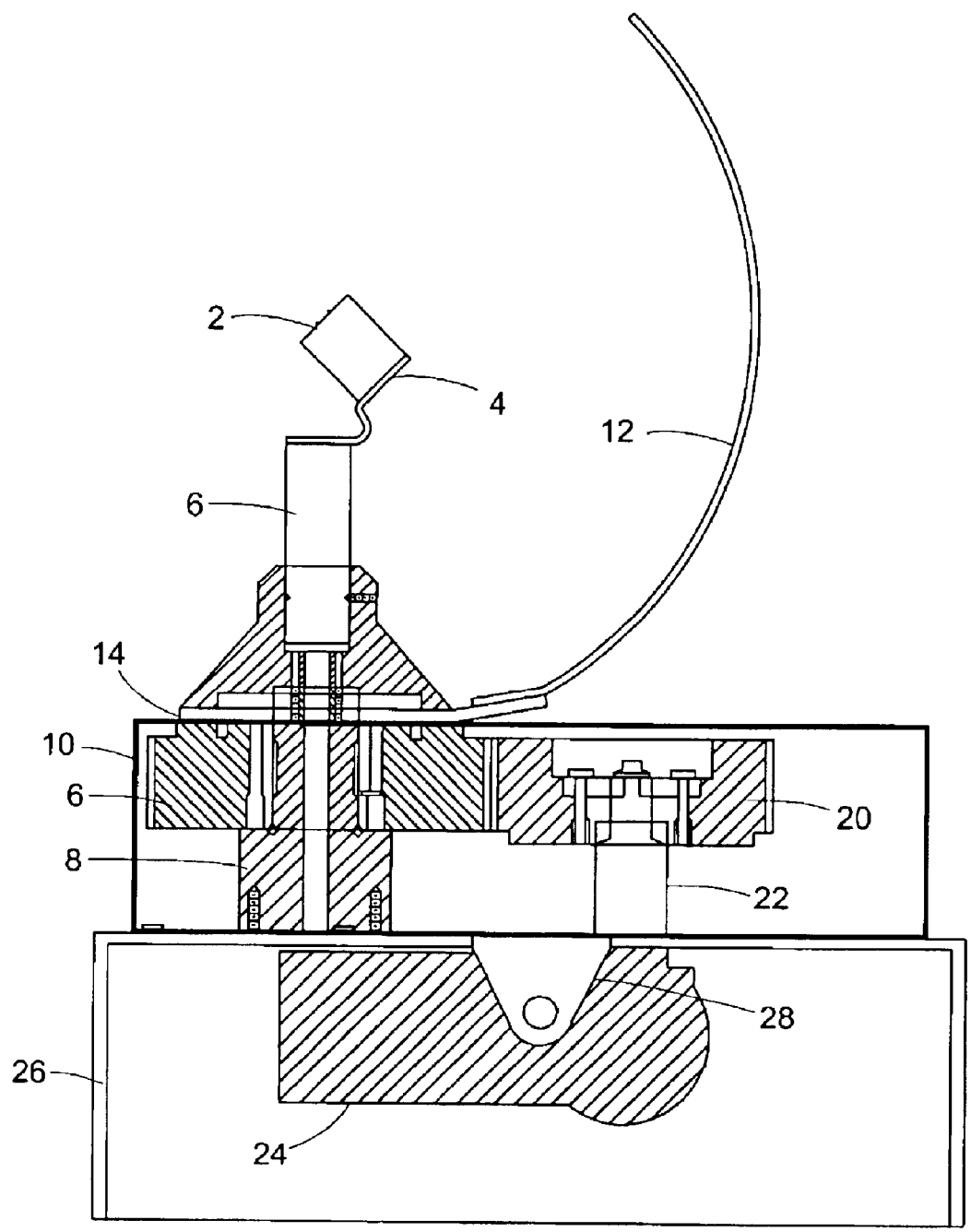
FIG. 2 is an enlargement of a part of FIG. 1, with portions broke away to illustrate the mechanical drive for the shadow band.
Figure 3:
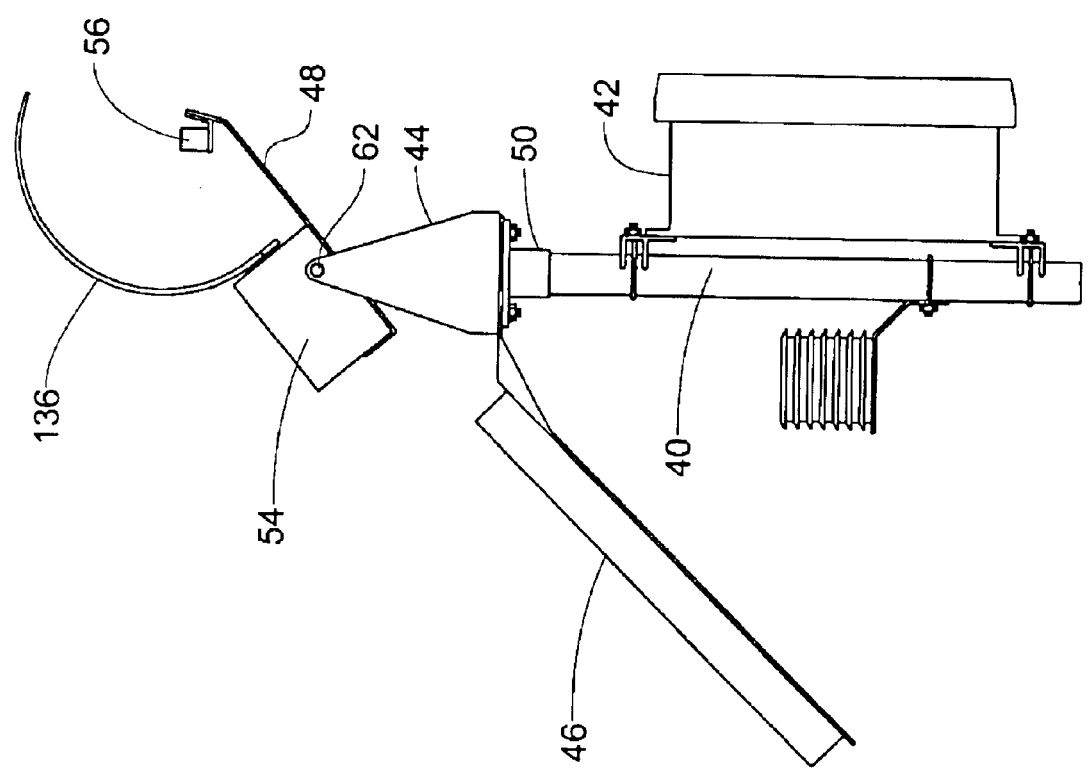
FIG. 3 is a side view in elevation of a pyranometer apparatus embodying the present invention.

Referring to FIG. 3, a vertical post 40 supports an enclosure 42 that houses a data logger apparatus, a PV controller, and a battery that serves as a power supply for the data logger and the PV controller. The data logger, controller and battery are not shown. The same post supports a U-shaped yoke 44 that in turn supports a PV module 46 and a pyranometer support bracket 48. The crossbar section of the yoke is attached to the post by a connector 50 that permits the yoke to be rotated relative to the post to a selected azimuth position. The PV module is connected to the battery (by wire cable not shown) and serves to generate d. c. power that keeps the battery charged. Bracket 48 serves as a support for a motor housing 54 and a sun light sensor 56.

Figure 4:
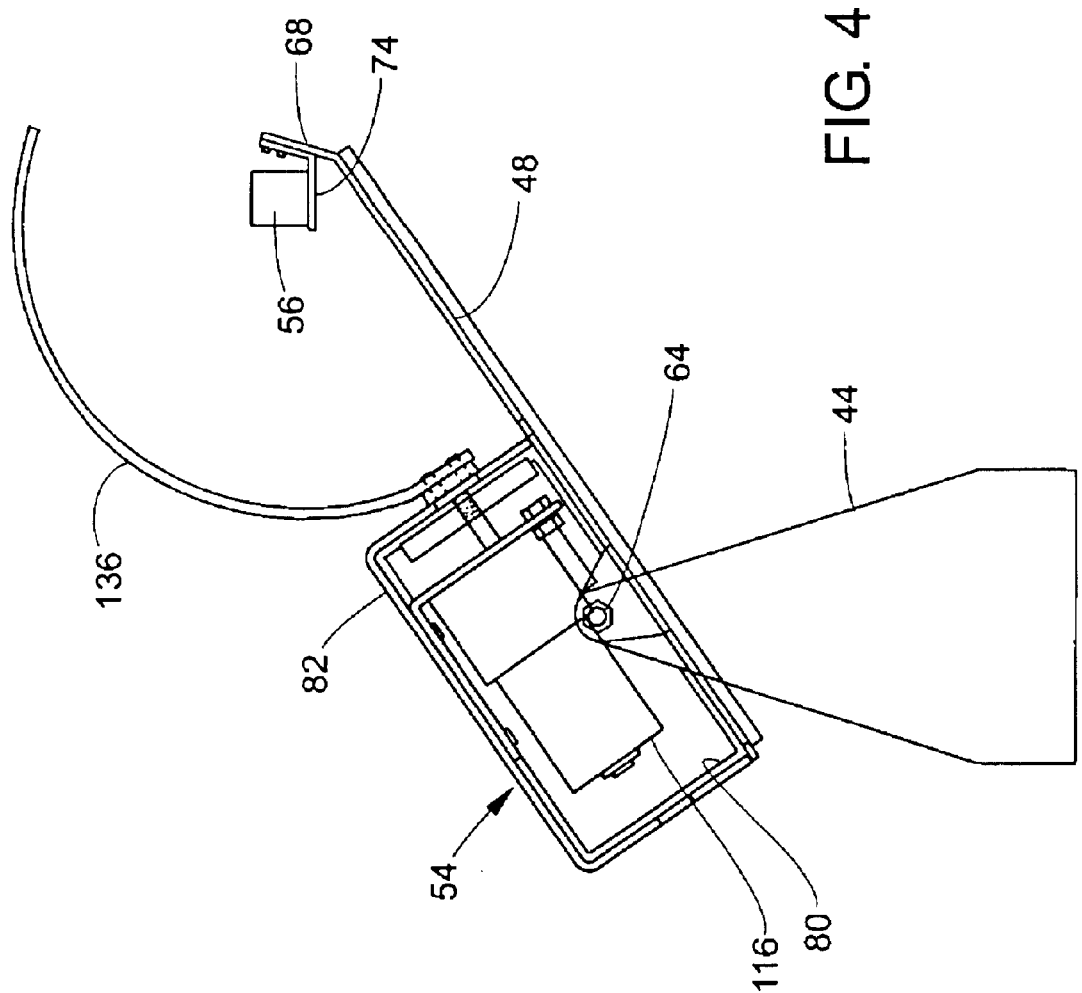
FIG. 4 is an enlarged side view in elevation of a portion of the apparatus shown in FIG. 3, with a portion of the motor housing omitted.
Figure 6:
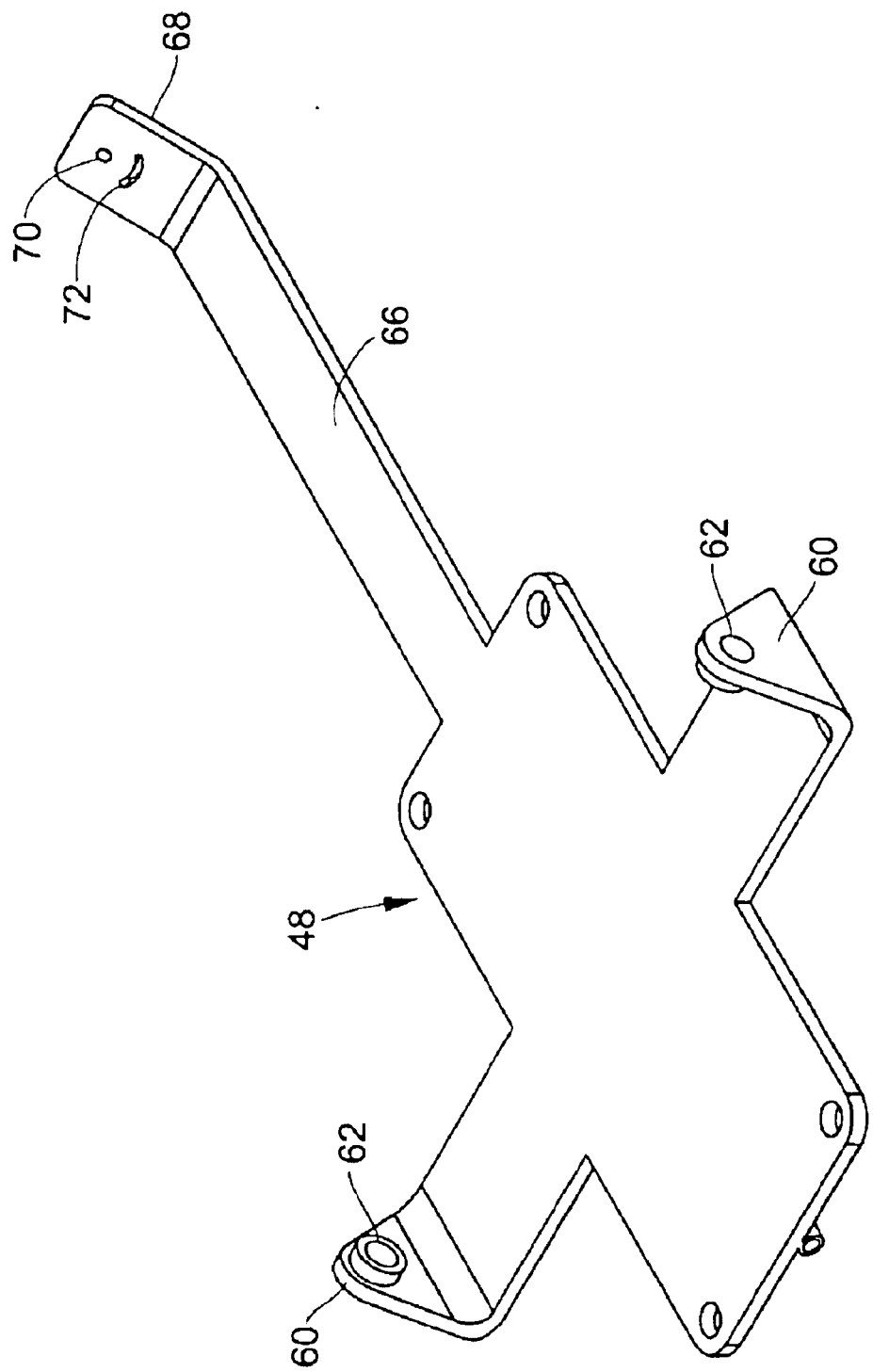
FIG. 6 illustrates the pyranometer mounting bracket.
Figure 7:
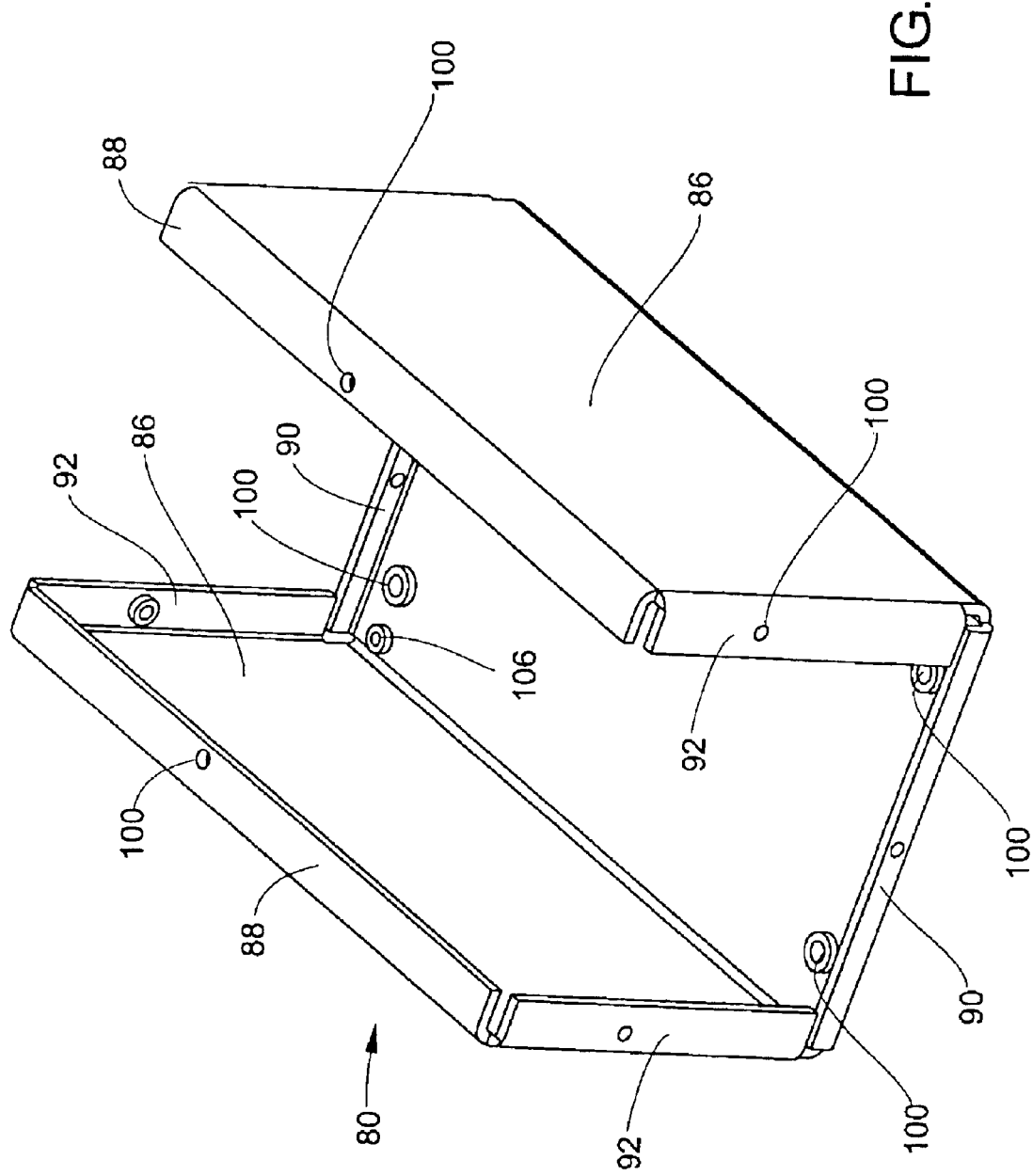
FIG. 7 illustrates one of the two parts of the motor housing.
Figure 8:
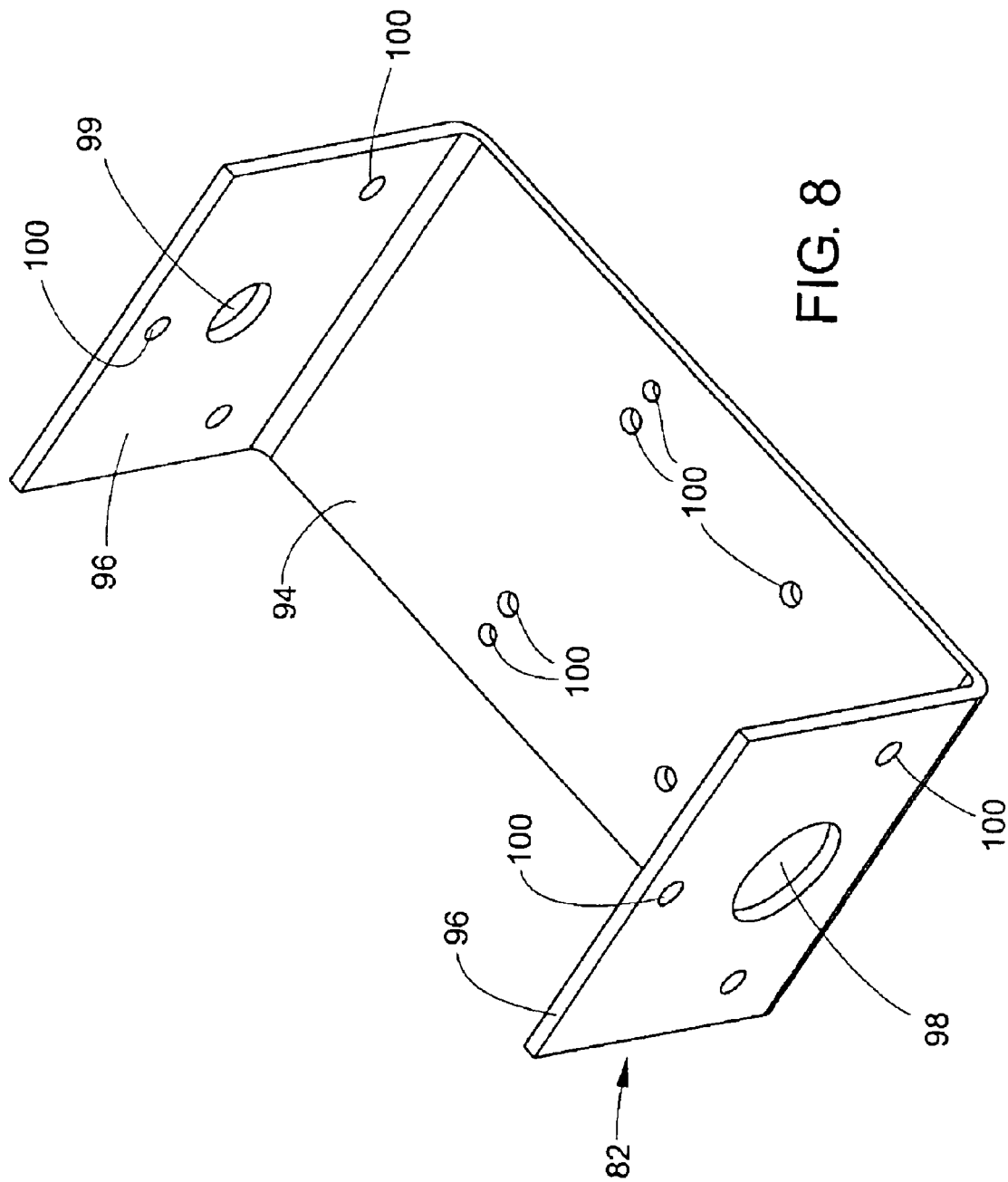
FIG. 8 illustrates the second part of the motor housing.
Figure 9:
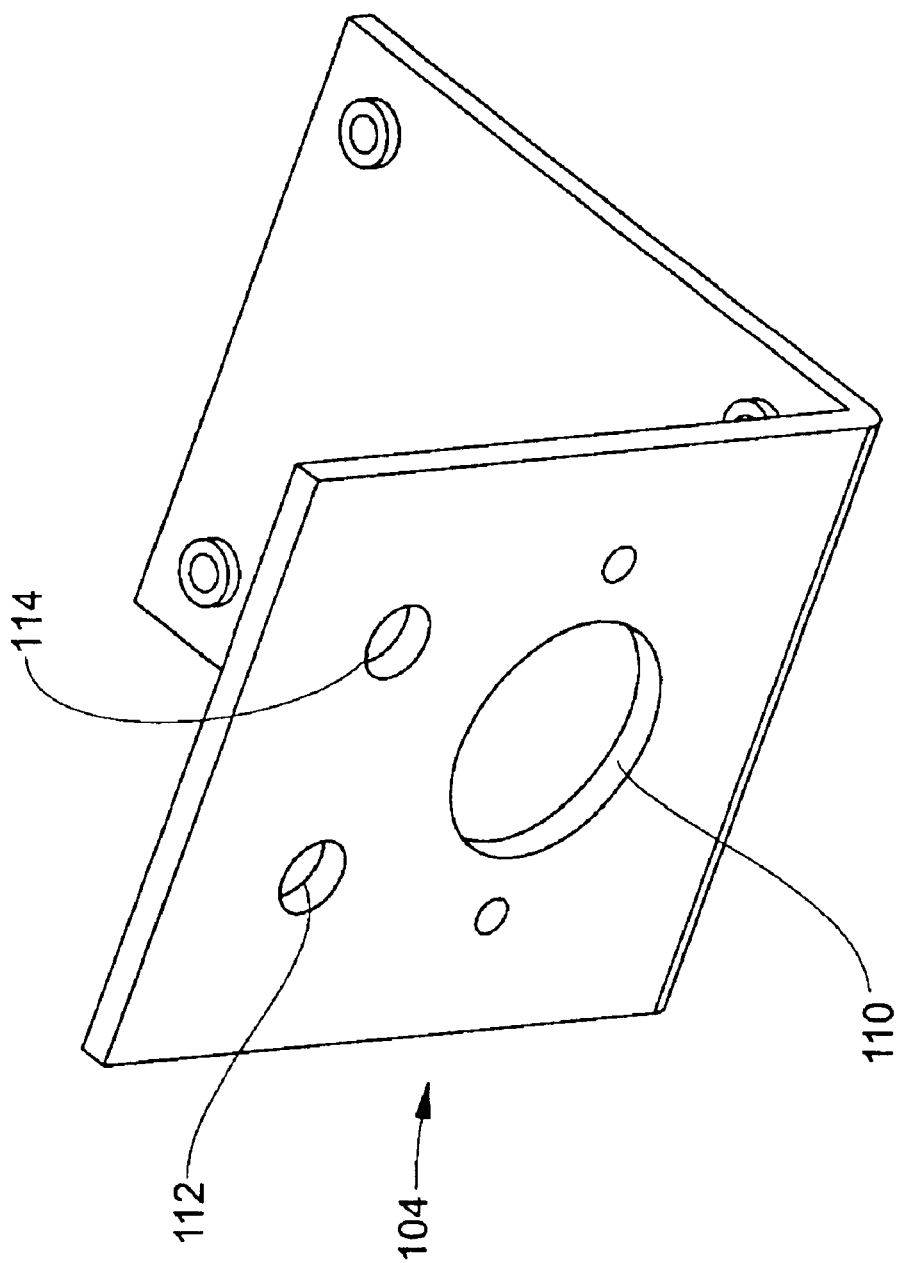
FIG. 9 illustrates the motor mount bracket.
Figure 11:
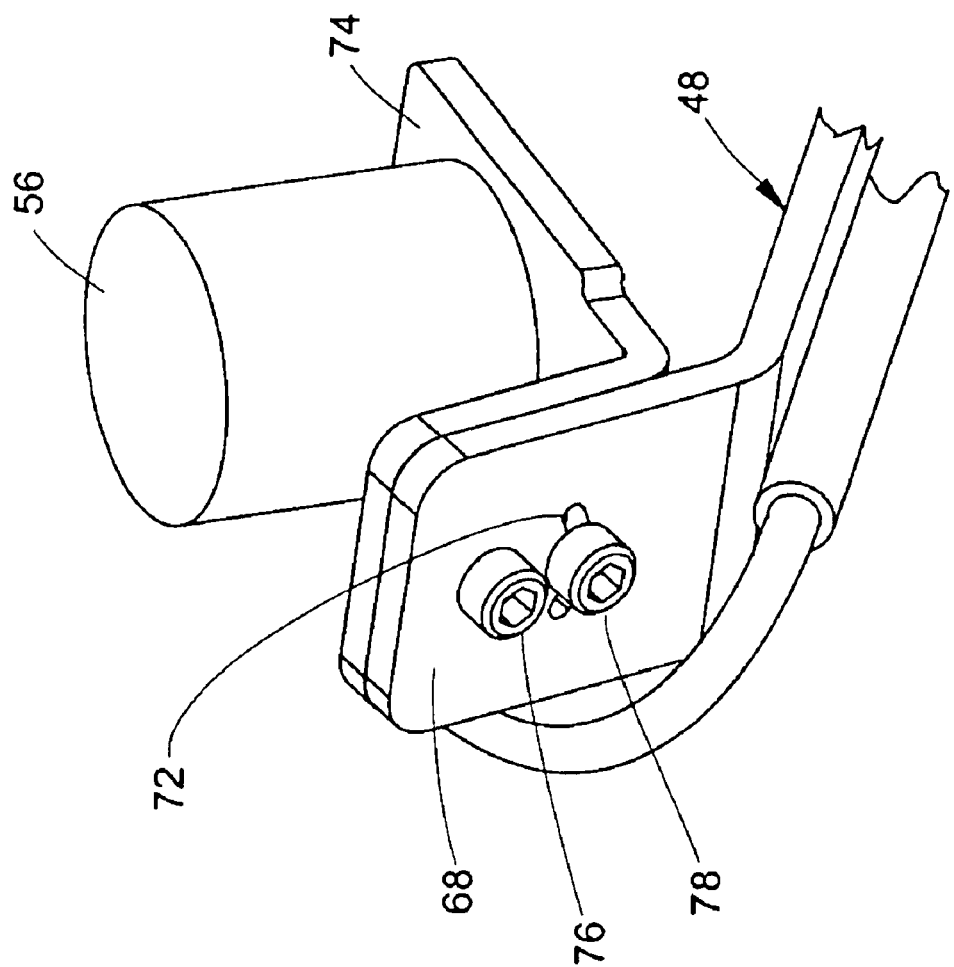
FIG. 11 illustrates the L-shaped bracket that supports the light sensor.

Referring to FIGS. 4, 6 and 11, bracket 48 is essentially cross-shaped, comprising a pair of laterally-extending arms 58 with upturned ears 60 at their opposite ends. Each ear 60 has a threaded hole 62 for receiving screws 64 that serve to pivotally connect bracket 48 to the two vertically extending arms of yoke 44. The screws can be tightened to lock bracket 48 in a selected angular position relative to the horizon. Bracket 48 also comprises a narrow extension 66 with a bent end portion 68. The latter is provided with a circular hole 70 and an arcuate hole 72 that is essentially concentric with hole 70. The opposite ends of hole 72 are equidistant from the end edge of bent end portion 68 and the center portion of hole 72 is furthest from that end edge. Mounted to the bent portion 68 is an L-shaped bracket 74 and attached to one end of bracket 74 is light sensor 56. The other end of the bracket 74 is provided with a first threaded hole that receives a screw 76 that passes through hole 70, and a second threaded hole that receives a screw 78 that passes through arcuate hole 72. The first screw 76 serves as a pivot shaft for bracket 74 to rotate relative to bracket 48. The second screw 78 serves to secure the bracket 74 in a selected angular position relative to bracket 48, with the elongated arcuate hole 72 coacting with screw 78 to determine the magnitude of the angle through which the bracket can rotate about its pivot screw 76. The sunlight sensor 56 is supported so that it is located in line with the axis of rotation of the shadow band 136 described hereinafter.

Referring to FIGS. 4–9, motor housing 54 comprises two housing parts 80 and 82. The 80 is generally of U-shaped cross-section, comprising a base panel 84, opposite side panes 86, inturned flanges 88 at the edges of the side panels, and end flanges 90 and 92 at the opposite ends of base panel 84 and side panels 86 respectively. The other housing part 82 also is of U-shaped configuration, comprising a longitudinally extending base panel 94 and opposite end panels 96 having aligned holes 98 and 99 respectively. Housing part 80 is attached to bracket 48. Housing part 82 fits over housing part 80 so that base panel 94 engages flanges 88. In this connection it is to be noted that housing parts 80 and 82 are provided with multiple threaded holes 100 for receiving fasteners (not shown) for securing them together and/or to bracket 48 or motor mount bracket 104 described hereinafter. Also, one end of housing part 80 is provided with two weep holes 106 located at opposite corners (only one weep hole 106 is visible in FIG. 7) for allowing escape of any moisture that may accumulate in the housing through leakage or condensation. With reference to the orientation of the housing as shown in FIG. 3, the weep holes are located at the lower end of the motor housing, thereby assuring escape of any moisture.

Referring again to FIGS. 4, 5, and 9–11, an L-shaped motor mount bracket 104 is attached to base panel 94 of housing part 82 by screws (not shown. Attached to the inwardly projecting portion 108 of bracket 104 is a reversible d. c. motor 120. The inwardly projecting portion of bracket 104 has three holes 110, 112 and 114. Hole 110 is sized to rotatably accommodate a forward portion of a d. c. motor 116 having an output shaft 118. Mounted in the two other holes 112 and 114 are two Hall-effect sensors 120 and 122. Mounted on motor shaft 118 is a circular disk 126 (FIG. 10) having embedded therein a circular magnet 128. The Hall-effect sensors are spaced from one another so that the angle between them measured with reference to the axis of motor shaft 118 is approximately 300° measured clockwise in FIG. 10 from sensor 120 to sensor 122, and the disk is sized and the magnet positioned on the disk so that the magnet will pass in front of each of the sensors as the disk is rotated back and forth by motor 116. The motor and the two Hall-effect sensors are connected to the controller in enclosure 42 by electrical cables (not shown) that pass through hole 99 in housing part 82. As described hereinafter, the motor is stopped when the magnet is sensed by either of the two Hall-effect sensors, and remains in that stopped position (the "stowed" position) until the motor is again energized by operation of the controller.

Figure 5:
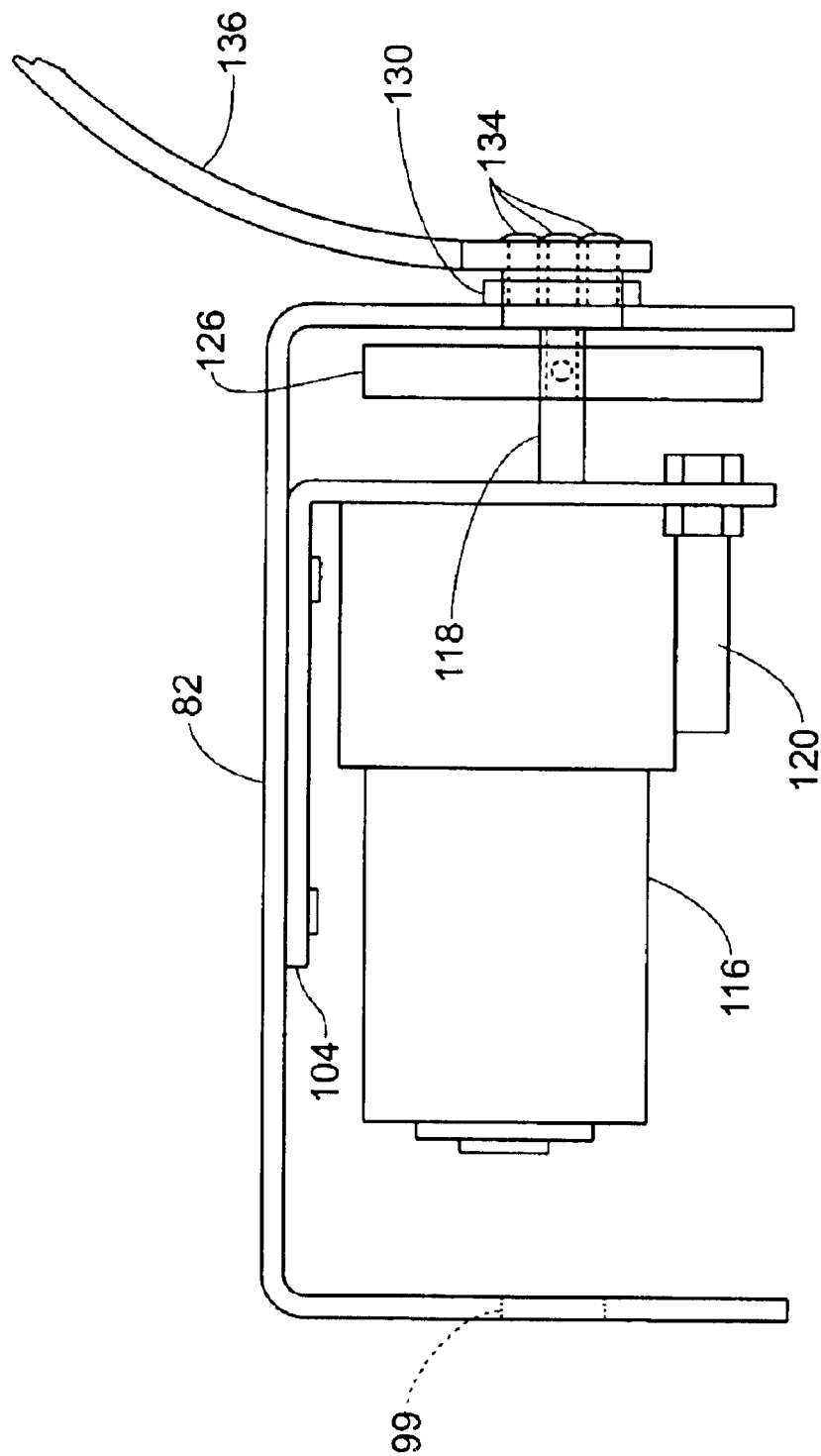
FIG. 5 is an enlarged sectional view illustrating the shadow band motor and associated components.
Figure 10:
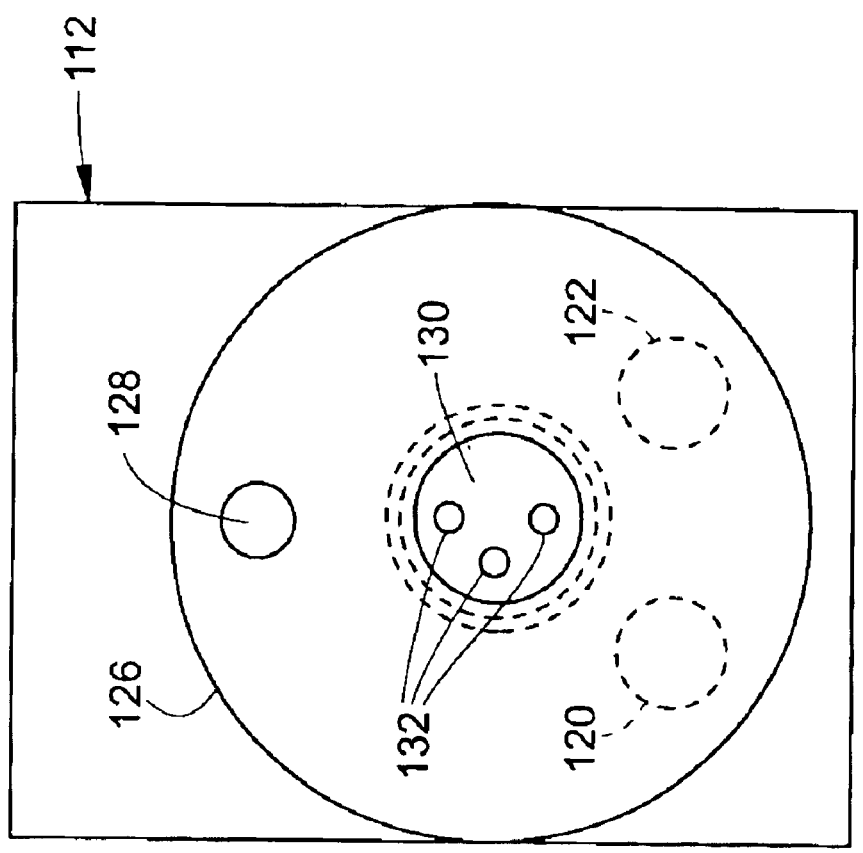
FIG. 10 is a view of the magnet-carrying disk looking from right to left in FIG. 5.

Referring to FIGS. 5 and 10, disk 126 has a hub 130 that extends through a hole 98 in housing part 82. Hub 130 has several tapped holes 132 for receiving screws 134 that serve to releasably secure one end of a circularly curved shadow band 136 to the hub. The band extends lengthwise through an angle of approximately 133° and has a 5 inch radius of curvature, with its forward or free end extending far enough so that when the motor is operated, some portion of the band can pass through a line extending directly from the optical axis of the light detector 56 to the sun. The distance between the light-receiving surface of light detector 56 and the band is constant throughout the entire length of the band. The width of the shadow band is such that it can cast a shadow wide enough to fully obscure the light-receiving surface of the sensor 60 at some position of the shadow band relative to the sun.

In the foregoing construction the pivot axis provided by screw 76 extends normal to the longitudinal center axis of light detector 56, with the distance between that detector and the shadow band remaining constant regardless of the position of screw 78 along the arcuate hole 72. The pyranometer construction also provides two degrees of tilt leveling. One degree is afforded by screws 76 and 78 which allow pyranometer bracket 74 with detector 56 to pivot a short distance around pivot screw 76. A second degree of tilt leveling is afforded by the pivot connection between yoke 44 and bracket 48. Additionally, the connector 50 allows for adjustment of azimuth pointing.

Figure 12:
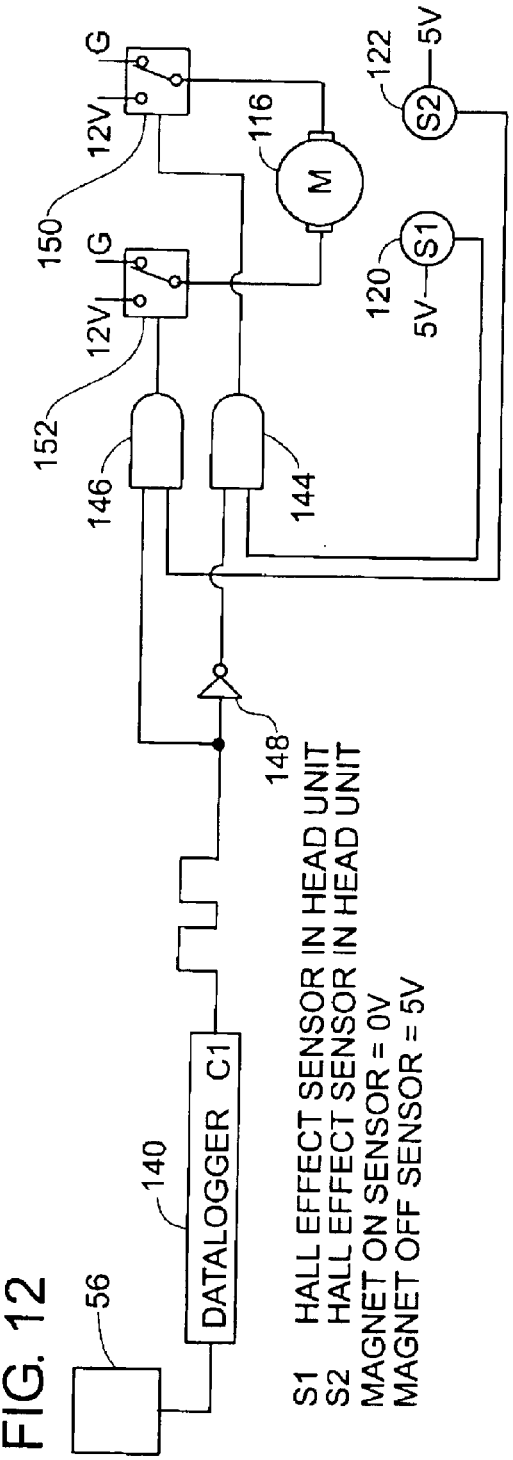
FIG. 12 is a schematic illustration of the electrical system for the apparatus of FIGS. 3–11.

FIG. 12 illustrates the electrical system of the apparatus shown in FIGS. 1–11. The system includes an electronic datalogger represented schematically at 140 and a motor controller 142 that includes motor 116. Details of the datalogger are not provided since such apparatus is well known and may take various forms, e.g., a digital computer. Although not shown, it is to be appreciated that the d. c. power supply for light sensor 56, datalogger 140, motor controller 142, motor 116 and Hall Effect sensors 120 and 122 may be a battery (not shown), e.g., one that is kept charged by d. c. current derived from a PV module as shown at 38, or from some other power source.

The controller supplies the logic for applying power to rotate the motor in either direction. Essentially the controller comprises a pair of and gates 144 and 146 each having one input terminal connected to a common output port of the datalogger, with the datalogger output signal C1 being applied to and gate 144 via an inverter 148. The other input terminals of gates 144 and 146 are tied to Hall-effect sensors 120 and 122 respectively. Each Hall-effect sensor produces a high (positive) output signal when the magnet is not aligned with it and a low (negative) output signal when the magnet is aligned with it. The output signals of sensors 120 and 122 are identified hereinafter as S1 and S2 respectively. The output terminals of gates 120 and 122 are connected to semiconductor logic circuits that are represented graphically as latching relays 150 and 152. The latter have a positive d. c. voltage terminal contact, a grounded terminal contact and an output terminal contact, with the latter contact of relays 150 and 152 being connected to opposite sides of motor 116.

Figure 13:
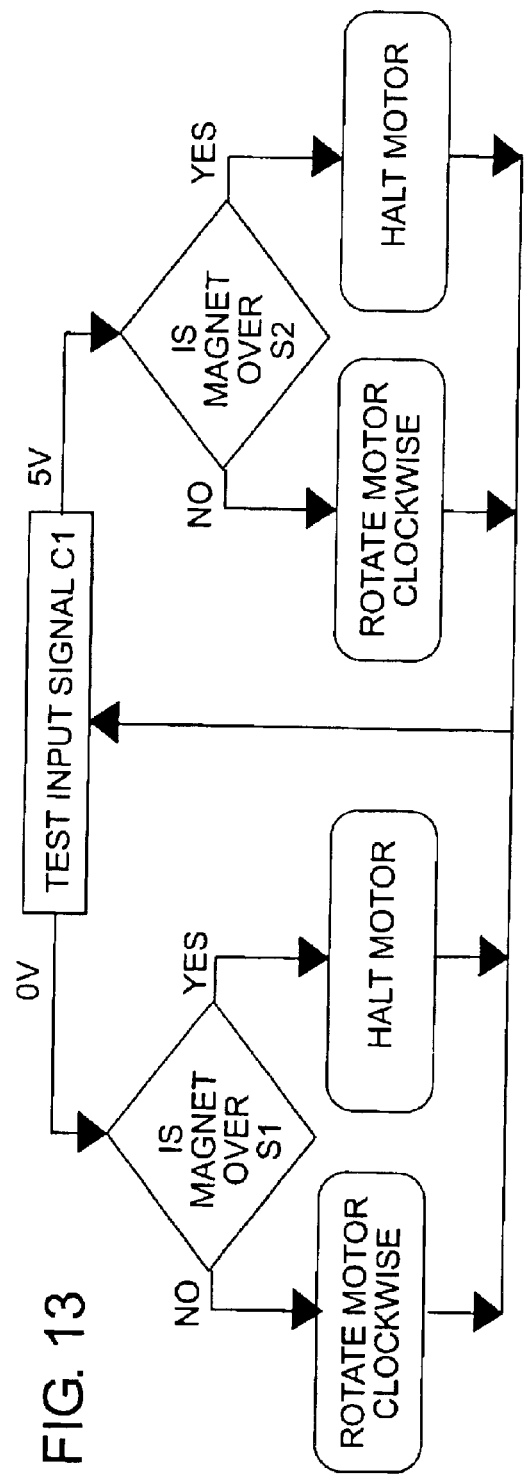
FIG. 13 is a diagrammatic representation of the operation of the motor controller.

Operation of the motor controller will now be described with reference to FIGS. 12 and 13. The datalogger output is a pulse train with a selected repetition rate. In the preferred embodiment of the invention the repetition rate is set at one minute, and the pulse width is approximately one second, which is the transit time desired for the motor to rotate the shadow band 136 from one limit position characterized by the magnet being aligned with Hall-effect sensor 120 and a second limit position characterized by the magnet being aligned with the other Hall-effect sensor 122. Controller 142 has four states as follows:

First state: C1 is low; magnet aligned with sensor 120 so S1 is low.

Second state: C1 is low; magnet not aligned with sensor 120 so S1 is high.

Third state: C1 is high; magnet aligned with sensor 122 so S2 is low.

Fourth state: C1 is low; magnet not aligned with sensor 122 so S2 is high.

Accordingly the operating action of the motor as determined by controller 142 is as follows: (1) in the first state, the input to and gates 144 and 146 from the datalogger are high and low respectively and the inputs to the same gates from sensors 120 and 122 are low and high respectively, with the result that the relays are in the states shown in FIG. 12 with the motor stopped since both of its terminals are connected to ground; (2) in the second state, the output from sensor 120 goes high and the output from sensor 122 remains high, with the result that the output from and gate 144 causes relay 150 to change states and thereby initiate operation of the motor; (3) in the third state, the input signals to and gates 144 and 146 from the datalogger are low and high respectively, the sensor signal S1 is high and the sensor output S2 is low, resulting in the motor being stopped due to the relays again being in the state shown in FIG. 13; and (4) in the fourth state, the inputs signals to and gates 144 and 146 from the datalogger are low and high respectively and the sensor signals S1 and S2 are high and low respectively, resulting in relay 150 switching to connect its high voltage terminal to motor 116, whereupon the motor is energized to run in reverse to its direction of operation during the second state.

To summarize, assuming that the motor is stopped with magnet 128 aligned with sensor 120 and that the datalogger is operating to generate a pulse train as described above, when the output from the datalogger goes low, the motor controller will keep the motor de-energized if the magnet 128 is aligned with sensor 120 and will energize the motor to run in a first (e.g., clockwise) direction if the magnet is not aligned with sensor 120, and when the datalogger output goes high, the motor controller will keep the motor de-energized if the magnet it aligned with sensor 122 and will energize the motor to run in a second opposite direction if the magnet is not aligned with sensor 122. With the datalogger producing a continuous pulse train as described, the system will sequentially rotate the shadowband from a first limit position determined by alignment of magnet 128 with sensor 120 to a second limit position determined by alignment of magnet 128 with sensor 122, hold the shadowband in that position for a limited time, then rotate the shadow band back to the first limit position, hold the shadowband in that position for a limited time, and then repeat the foregoing cycle of start and stop movement.

The datalogger of the above-described rotating shadowband apparatus uses the single light sensor (pyranometer) to measure three components of sunlight, namely, total horizontal, direct normal and horizontal diffuse irradiance. These are related by the equation:

$$T_h = Dif_h + Dir_n \cos(Z),$$

which expresses $T_h$, the total irradiance measured on a horizontal surface; $Dif_h$, the diffuse irradiance (skylight) on a horizontal surface; $Dir_n$, the direct normal irradiance (sunlight directly incident on a surface facing the sun); and Z, the sun's zenith angle, the angle measured from straight overhead down to a sight-line to the center of the sun.

In the preferred mode of practicing the invention, the datalogger is programmed so that once per minute the shadowband (band) passes over the light sensor, traveling approximately 300 degrees from a first stowed (limit) position wherein the magnet 128 is in front of Hall-effect sensor 120 around to the other side of the bracket 48 to a second stowed (limit) position wherein the magnet is in front of Hall-effect sensor 122. On the next rotation, the band rotates in the reverse direction. One pass takes approximately one second. During this one-second period the pyranometer signal is sampled by light detector 56 about 700 times. The minimum pyranometer reading occurs when the sun is completely occluded by the band. The stream of high-sample-rate irradiance data is processed to measure the horizontal diffuse irradiance. With $T_h$, $Dif_h$ and Z known, $Dir_n$ is calculated.

Figure 14:
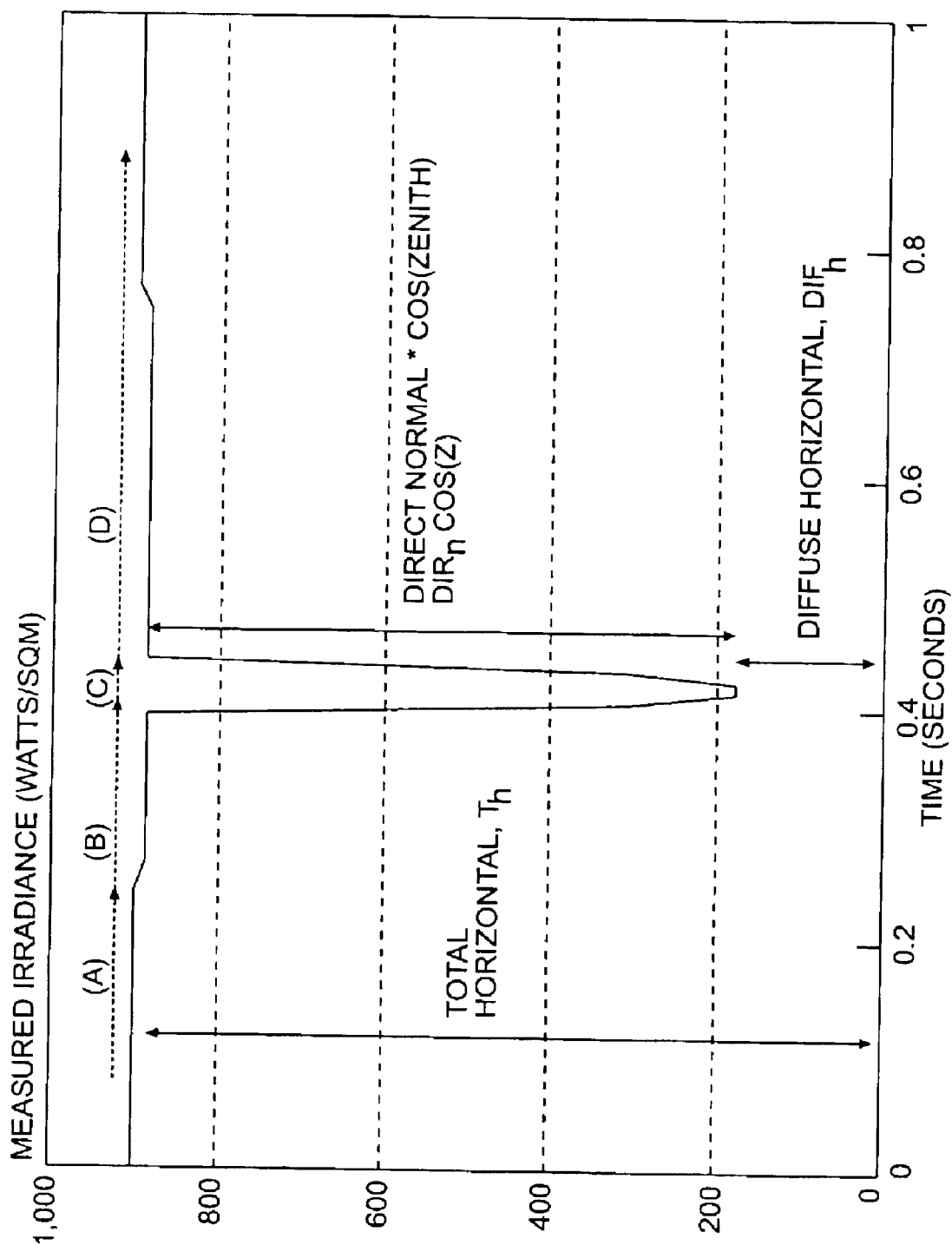
FIG. 14 is a graph illustrating the measurements during a single band rotation on a clear day.

Referring now to FIG. 14 which is a graph illustrating measurements during a single band rotation on a clear day, the pyranometer views the full sky while the band travels from its stowed position below and to one side of the sensor, up to the horizon (A). As the band traverses its path above the horizon, it blocks a small strip of the sky, reducing the diffuse irradiance falling on the sensor (B). The irradiance measurement drops dramatically when the band shades the sensor from direct sunlight (C). A symmetrical pattern occurs as the band completes its revolution, ending in its stowed position below and to the other side of the pyranometer (D).

An advantage of the invention herein described is that it is susceptible of modifications. Thus, for example, the motor housing may be constructed otherwise than as herein illustrated and described without affecting the mode of operation. Similarly the two Hall-effect sensors may be mounted in a different manner. Another advantage is that different forms of light sensors may be utilized to measure radiation, although a silicon photovoltaic solar cell is preferred. It is to be noted also that the motor controller represented in FIGS. 12 and 13 may be a component part of the datalogger or a separate device as shown. The motor controller may be in the form of hard-wired logic, but preferably the result represented in FIGS. 12 and 13 is achieved by appropriately programming a digital processor.

Other advantages of the invention herein described is that it overcomes the limitation of the ATI pyranometer described above and has a modular construction. The disk 126 helps protect against water penetration, since the disk hub is sized to pass through hole 98 with only enough gap to avoid binding. Inside the motor enclosure the enlarged diameter of disk 126 helps provide a barrier between the motor and any water that may penetrate the housing hole 98. The motor, sensors 120 and 122 and the assorted wiring are all located behind disk 126 and are further protected by the barrier presented by bracket 98. The disclosed motor housing also accommodates the electrical connections for the motor and the sensors 120 and 122 so that they also are protected from the weather. An important aspect is the provision of weep holes 106, whereby when the motor housing is oriented as shown in FIG. 3, any water that may enter the housing around the hub of disk 126 will flow down to the weep holes and exit the housing via those weep holes. Two other advantages are that the motor enclosure is mounted on the bracket 48 so that the geometry of the band with respect to the pyranometer 56 is fixed, yet the motor can be removed for viewing without disturbing the pyranometer 56 which can continue to function to measure solar radiation. Other advantages and modifications will be obvious to persons skilled in the art.

What is claimed is:

1. A pyranometer comprising:
   a reversible electric motor having an output shaft;
   a curved flat opaque band of selected width, said band having one end coupled to output shaft so that said band can rotate in time with said output shaft and so that the axis of rotation of said band is normal to said one end thereof;
   a mount adapted to for attachment to a supporting structure so as to provide adjustment of said mount in a first degree;
   motor-support means pivotally attached to said mount so as to provide adjustment in a second degree;
   a light sensor having a light-receiving surface;
   sensor support means for supporting said sensor so that the center of said light-receiving surface is substantially coaxial with the axis of rotation of said band, said sensor support means being adapted to permit adjustment of said light sensor in a third degree; and
   motor control means for controlling operation of said motor so that periodically said band rotates through a selected angle from one stowed position to a second stowed position, with said stowed positions being such that said band casts a shadow on said light-receiving surface only while it is rotating.

2. A pyranometer according to claim 1 wherein said selected angle is approximately 300 degrees.

3. A pyranometer according to claim 1 wherein said band has a width such that it will cast a shadow that extends over all of said light-receiving surface when said band is disposed directly in line with the sun and said light-receiving surface.

4. A pyranometer according to claim 1 wherein said motor support means is a yoke having a base section attached to said mount and a pair of arms, and further including attachment means for coupling said motor to said arms.

5. A pyranometer according to claim 4 further including mechanical means defining a housing for said motor, and further wherein said attachment means comprises a bracket and said housing is attached to said bracket.

6. A pyranometer according to claim 5 wherein said sensor support means is attached to said bracket.

7. A pyranometer according to claim 5 wherein said sensor support means is pivotally attached to said bracket so as to provide said adjustment in a third degree.

8. A pyranometer according to claim 1 wherein said motor control means comprises a circular disk attached to said output shaft, a magnet mounted to said circular disk in fixed angular relation to said band, a first magnet-responsive detector mounted so as to (a) sense said magnet when said band approaches said first stowed position and (b) generate a control signal that causes said motor to stop with said band in said first stowed position, and a second magnet-responsive detector mounted so as to (a) sense said magnet when said band approaches said second stowed position and (b) generate a control signal that causes said motor to stop with said band in said second stowed position.

9. A pyranometer according to claim 8 wherein said light sensor produces an output signal in response to light impinging on said light-receiving surface, and further including means for sampling said output signal a selected number of times as said band moves from one to the other of said first and second stowed positions, whereby to obtain a stream of irradiance data.

10. A pyranometer according to claim 9 further including means for processing said irradiance data to measure the horizontal diffuse irradiance $Dif_h$.

11. A pyranometer according to claim 9 further including means for determining the direct normal irradiance $Dir_n$ according to the equation $T_h = Dif_h + Dir_n \cos(Z)$, where Z is the sun's zenith angle.

12. A pyranometer comprising:
   a motor support member mounted for rotational movement on a first vertical axis;
   a motor unit attached to said motor support member for rotational movement on a second horizontal axis, said motor unit comprising a reversible electric motor having an output shaft;
   a shadow band having a selected width and first and second opposite ends, said first opposite end being attached to said output shaft so that said shadow band will rotate with said output shaft, said band being curved between said first and second opposite ends with its curvature extending through an angle of about 133 degrees;
   a sunlight sensor having a light-receiving surface;
   sunlight sensor support means spaced from said output shaft but supporting said sunlight sensor so that it is located in line with the axis of rotation of said output shaft, with the distance between said sunlight sensor and said band being substantially the same along the full length of said band;
   motor control means for controlling operation of said motor so that periodically said band rotates through a selected angle of approximately 300 degrees from one stowed position to a second stowed position, with said stowed positions being such that said band casts a shadow that fully occludes said light-receiving surface only once as it rotates between stowed positions.

13. A pyranometer according to claim 12 wherein said motor support member comprises two arms, and further including means connecting said motor unit to said arms so said motor unit can pivot on a selected pivot axis relative to said arms, said pivot axis extending at a right angle to axis of said output shaft.

14. A pyranometer according to claim 12 wherein said sunlight sensor can pivot on an axis that extends at an angle to said selected pivot axis of said motor unit and also the axis of rotation of said shadow band.

15. A pyranometer according to claim 14 wherein said motor control means comprises a magnet mounted for rotation in synchronism with said output shaft, said magnet having a fixed angular relationship with said shadow band, first and second Hall effect sensors mounted in position to sense said magnet and generate a control signal when said shadow band has moved into said first and second stowed positions respectively, and means for stopping said motor in response to a control signal from said first or second Hall effect sensor.

16. A pyranometer according to claim 15 wherein said light sensor produces an output signal in response to light impinging on said light-receiving surface, and further including means for sampling said output signal a selected number of times as said band moves from one to the other of said first and second stowed positions, whereby to obtain a stream of irradiance data.

17. A pyranometer according to claim 16 further including means for processing said irradiance data to measure the horizontal diffuse irradiance $Dif_h$.

18. A pyranometer according to claim 16 further including means responsive to said output signal for determining the direct normal irradiance $Dir_n$ according to the equation $T_h = Dif_h + Dir_n \cos(Z)$, where Z is the sun's zenith angle.

* * * * *

UNITED STATES PATENT AND TRADEMARK OFFICE
CERTIFICATE OF CORRECTION

PATENT NO.    : 6,849,842 B2
DATED         : February 1, 2005
INVENTOR(S)   : Ruel D. Little It is certified that error appears in the above-identified patent and that said Letters Patent is hereby corrected as shown below:

Column 8,
Line 23, insert -- said -- before "output shaft";
Line 27, delete "to" after "adapted";

Column 10,
Line 11, insert -- that -- before "said motor unit"; and
Line 12, insert -- the -- before "axis" (second occurrence).

Signed and Sealed this

Third Day of May, 2005

JON W. DUDAS
*Director of the United States Patent and Trademark Office*